United States Patent Office 3,153,657
Patented Oct. 20, 1964

3,153,657
ALKYL-2-(1,4-BENZODIOXYL)-KETOXIMES
Claude I. Judd, Mequon, and John H. Biel, Milwaukee, Wis., assignors to Colgate-Palmolive Company, a corporation of Delaware
No Drawing. Filed July 9, 1962, Ser. No. 208,554
19 Claims. (Cl. 260—340.3)

This invention relates to novel chemical compounds and processes of preparing the same. More particularly, this invention is concerned with novel derivatives of 1,4-benzodioxane, processes of producing such compounds and uses thereof.

This application is a continuation-in-part of our co-pending application Serial No. 90,193, filed February 20, 1961, and now abandoned.

According to one aspect of the present inventon there are provided novel 2-(1,4-benzodioxyl)alkanals, alkanones, aldoximes and ketoximes of the formula

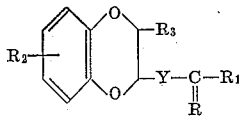

wherein Y is a chemical bond or a straight or branched lower alkylene, advisably of not more than five carbons, such as methylene, ethylene, isopropylene and butylene, R is oxygen, oximino and the groups =NOA wherein A is an alkali metal such as sodium or potassium, an alkaline earth metal such as calcium, or the group

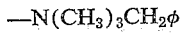

—N(CH₃)₃CH₂φ

$R_1$ is hydrogen, a lower alkyl such as methyl, ethyl, isopropyl and butyl, phenyl, a phenyl-lower alkyl such as benzyl, phenethyl, phenylisopropyl, p-methoxybenzyl and other nuclear substituted phenyl-lower alkyl groups, a cycloalkyl advisably of 3 to 6 carbons in the ring such as cyclopropyl, cyclobutyl, cyclopentyl and cyclohexyl, a heterocyclic or heterocyclic alkyl group such as pyridyl, pyrrolyl, thienyl, thenyl, pyrimidyl, pyridylalkyl, thiazolyl and imidazolyl and $R_2$ is at least one nuclear substituent of the group consisting of hydrogen, nitro, amino, lower alkyls such as methyl, ethyl and isopropyl, lower alkoxys such as methoxy and ethoxy, halogens such as bromine and chlorine, trifluoromethyl, lower alkyl thio groups such as methylthio and ethylthio, phenyl-lower alkyls such as benzyl and phenethyl, lower alkenyls such as allyl and lower alkynyls such as propargyl, and $R_3$ is hydrogen, a lower alkyl such as methyl or ethyl, phenyl, or an aralkyl such as a phenyl-lower alkyl including benzyl and phenethyl.

The compounds are produced by reacting a 1,2-dihydroxybenzene with a dihaloalkanone or dihaloaldehyde to produce an intermediate 2-(1,4-benzodioxyl)-alkanone or 2-(1,4-benzodioxyl)-alkanal which is then reacted with hydroxylamine to produce a 2-(1,4-benzodioxyl)-alkanaldoxime or 2-(1,4-benzodioxyl)-alkanoneoxime. This proces can be represented as follows:

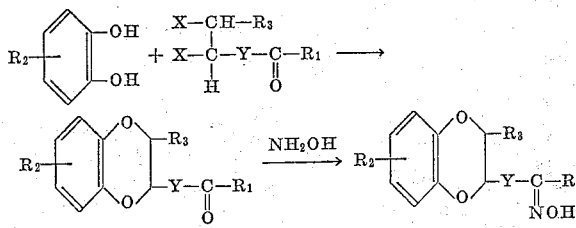

wherein X is a reactive halogen such as bromine or chlorine, and Y, $R_1$, $R_2$, and $R_3$ have the assigned significance.

In the first step of the process there can be used, in addition to 1,2-dihydroxybenzene (catechol), other 1,2-dihydroxybenzenes containing other nuclear substituents such as 1,2-dihydroxy-4-methoxybenzene, 1,2-dihydroxy-4 - trifluoromethylbenzene, 1,2-dihydroxy-3-methylbenzene, 1,2-dihydroxy-4,5-methylenedioxybenzene, and 1,2-dihydroxy-3-alkoxybenzenes as shown in U.S. Patent 2,922,744. Other compounds which can be used are shown in U.S. Patent 2,906,757.

Some of the dihaloalkanones and dihaloaldehydes which can be used in the process are 3,4-dibromo-2-butanone, 2,3 - dichloropropionaldehyde, 3,4 - dichlorobutyraldehyde, 4,5-dibromo-3-pentanone, 4,5-dibromo-2-pentanone, 4,5 - dichlorovaleraldehyde, 3,4 - dibromo-2-pentanone, 3,4-dibromo-2-hexanone, 3,4-dibromocaproaldehyde, 1-phenyl - 2,3 - dibromopropanone, alpha,beta-dichlorobutyrophenone, beta,gamma-dibromobutyrophenone and 1-phenyl-5,6-dibromo-3-hexanone.

The reaction between the 1,2-dihydroxybenzene and dihaloalkanone or dihaloaldehydes is readily effected by bringing the reactants together in a suitable reaction medium such as water, acetone, alcohol, tetrahydrofuran and dimethylformamide, advisably in the presence of a suitable acid acceptor such as an alkali metal hydroxide, bicarbonate or carbonate or a tertiary amine such as triethylamine. The reaction proceeds at room temperature although lower and higher temperatures can also be used. The reactants are preferably combined in equimolar amounts although this ratio can be varied.

In order to avoid side reactions the aldehyde reactants are advisably first converted to an acetal before being brought into reaction with the dihydroxybenzene. After the reaction is completed and the desired product is formed the aldehyde can be reformed by hydrolyzing the acetal, as with an aqueous mineral acid and particularly concentrated hydrochloric acid. It is also advisable to block any additional hydroxy group on the phenyl part of the 1,2-dihydroxybenzene reactant by converting it to an ether such as the benzyloxy group. Mild catalytic hydrogenation can then be employed subsequently to cleave the protecting group and thus reform the nuclear hydroxy group.

The reaction between the dihydroxybenzene and dihaloalkanone or dihaloaldehyde is essentially completed in about 4 to 10 hours. After the reaction is terminated the reaction mixture can be separated into two layers and the oily layer containing the product extracted with ether and recovered by fractional distilaltion.

Representative of the 2-acyl or 2-acylalkyl-1,4-benzodioxanes which are produced in this way are 2-acetyl-1,4-benzodioxane, 2-formyl - 1,4 - benzodioxane, 2-propionyl-1,4-benzodioxane, 2 - butyryl - 1,4 - benzodioxane, 2-acetonyl-1,4-benzodioxane, 2-benzoyl-1,4-benzodioxane, 2-phenylacetyl-1,4-benzodioxane, 2 - (3-phenylpropionyl)-1,4 - benzodioxane, benzyl-[2-(1,4-benzodioxyl)]-ketone, 2-phenethyl - 2 - [2-(1,4-benzodioxyl)]ethyl ketone and benzyl-[2-(1,4-benzodioxyl)]-methyl ketone, 2-[2-(1,4-benzodioxyl)]-acetaldehyde, 3 - [2 - (1,4-benzodioxyl)]-propionaldehyde, 2-acetyl - 3 - methyl-1,4-benzodioxane, 2-propionyl-3-ethyl-1,4-benzodioxane and the corresponding compounds containing at least one nuclear substituent on the aryl (phenyl) ring of the benzodioxane group such as 6-methoxy, 6-chloro, 7-trifluoromethyl, 6,7-methylenedioxy, 5-hydroxy, 8-hydroxy, 8-methoxy, 5-ethoxy, 5-methoxy-8-chloro, 5-bromo-8-ethoxy and 7-chloro-8-ethoxy.

Some of the compounds of this invention can also be produced by reacting a 1,2-dihydroxybenzene with an alpha,beta-dihalopropionitrile to produce an intermediate 2-cyano-1,4-benzodioxane which upon reaction with a Grignard reagent yields a 2-acyl-1,4-benzodioxane. This process can be represented as

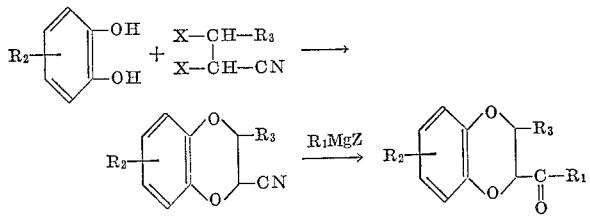

wherein $R_1$, $R_2$, $R_3$ and X have the assigned meaning and Z is a reactive halogen such as chlorine, bromine or iodine.

1,2-dihydroxybenzenes such as those previously named can be used in this process.

Some of the alpha-beta-dihalopropionitriles which can be used in the process are alpha,beta-dibromopropionitrile- alpha,beta-dichloro-beta-methyl propionitrile, alpha,beta-dibromo-beta-phenyl propionitrile, alpha,beta-dichloro-beta-benzyl propionitrile and alpha,beta-dibromo-beta-ethyl propionitrile.

The reaction is readily effected by bringing the 1,2-dihydroxybenzene and alpha,beta-dihalo-propionitrile together under liquid reaction conditions, such as in an inert organic medium including xylene, acetone, alcohol and benzene. An acid acceptor can be added to facilitate the reaction. The reaction proceeds at room temperature although higher temperatures such as at reflux can be used. The product can be isolated from the reaction mixture by conventional procedures.

Some of the novel products that are produced in this way are 2-cyano-1,4-benzodioxane, 2-cyano-3-methyl-1,4-benzodioxane, 2 - cyano - 3 - phenyl - 1,4-benzodioxane, 2-cyano-3-benzyl-1,4-benzodioxane and 2-cyano-3-ethyl-1,4-benzodioxane.

The 2-cyano-1,4-benzodioxane is reacted with a suitable Grignard reagent and the ketimine salt so formed is hydrolyzed to form a 2-acyl-1,4-benzodioxane.

Some of the Grignard reagents which can be used are methylmagnesiumbromide, phenylmagnesiumiodide, ethylmagnesiumchloride and benzylmagnesiumbromide.

The Grignard reaction is readily effected employing conventional conditions of solvent, temperature and the like. The complex ketimine salt is readily hydrolyzed by adding water to the resulting reaction mixture. The product can be isolated and purified by standard procedures.

2-acyl-1,4-benzodioxanes such as those named herein previously can be produced in this way.

The aldehydes and ketones of this invention, such as those just described, are next converted to oximes by reaction with hydroxylamine, advisably in an organic reaction medium in which the reactants are soluble. The hydroxylamine is produced in situ by the neutralization of a hydroxylamine salt such as the hydrochloride. Inorganic bases such as the alkali metal hydroxides, carbonates and bicarbonates, as well as organic bases such as pyridine, can be used to neutralize the acid released from the hydroxylamine salt.

Lower alcohols such as ethanol and isopropanol, as well as other organic solvents in which the reactants are soluble, such as tetrahydrofuran, can be used as the reaction medium. The reaction is promoted by the use of moderately elevated temperatures with the reflux temperature being particularly suitable. The reaction is substantially completed in about 1 to 4 hours. After the reaction is terminated the reaction mixture can be chilled with ice water, extracted with ether and the oily product isolated by fractional distillation.

Some of the 2-(1,4-benzodioxyl)-alkanaldoximes and 2-(1,4-benzodioxyl)alkanoneoximes which are produced as described are methyl 2-(1,4-benzodioxyl)-ketoxime, ethyl 2-(1,4-benzodioxyl) ketoxime, isopropyl 2-(3-methyl-1,4-benzodioxyl)ketoxime, phenyl 2-(1,4-benzodioxyl)-ketoxime, benzyl 2-(1,4-benzodioxyl)ketoxime, phenylethyl 2-(1,4-benzodioxyl)ketoxime, 2-[2-(1,4-benzodioxyl)]-acetoneoxime, 4-[2-(1,4-benzodioxyl)]-2-butanoneoxime, 1-[2-(1,4-benzodioxyl)]-2-butanoneoxime, 1-phenyl-3-[2-(1,4-benzodioxyl)] - 2 - propanoneoxime, phenyl-[2-(1,4-benzodioxyl)] methyl ketoxime, benzyl 2-[2-(1,4-benzodioxyl)]-ethyl ketoxime, 2-[2-(1,4-benzodioxyl)]-acetaldehyde oxime, 3-[2-(1,4-benzodioxyl)]-propionaldehyde oxime, 2-[2-(3-methyl-1,4-benzodioxyl)]-acetaldehyde oxime and similar compounds containing one or two substituents on the aryl (phenyl) ring of the benzodioxane group such as 6-methoxy, 6-chloro, 7-trifluoromethyl, 6,7 - methylenedioxy, 5 - methoxy - 8 - chloro, 5-bromo-8-ethoxy and 7-chloro-8-ethoxy.

All of the compounds of this invention effect skeletal muscle relaxation in animals. Methyl-2-(1,4-benzodioxyl)ketoxime is an especially effective muscle relaxant. It is also a strychnine antagonist. The compounds of this invention, including the acetals and ketals described infra, are also indicated to be analgesics, tranquilizers and anticonvulsants.

The oximes can be administered as such or in the form of their nontoxic alkali metal, alkaline earth metal or benzyl trimethylammonium salts. The salt form is especially desirable where the free oximes are oils.

The alkali metal salts can be prepared by reacting the oxime with an alkali metal alkoxide such as sodium or potassium ethoxide. The alkaline earth metal as well as the alkali metal salts can also be prepared by reaction with an alkaline earth metal hydride or alkali metal hydride including calcium hydride and sodium hydride. The benzyl trimethylammonium salt is produced by reacting the oxime with benzyl trimethylammonium hydroxide.

To achieve a therapeutic effect in an animal or human one or more of the oximes can be administered as a unit-dosage form in sufficient amount to obtain the desired therapeutic effect. However, it is desirable in most instances to administer the compounds combined with a suitable pharmaceutical carrier or diluent to achieve a more convenient size to dosage relationship. Since some of the oximes are oils, they can be packaged as capsules or in a liquid dispersion or solution. Tablets might also be produced with suitable pharmaceutical diluents.

According to a further aspect of this invention the 2-(1,4-benzodioxyl)-alkanones are converted to acetals and ketals by reaction with mono or polyhydric (di) alcohols. The preparation of the acetals and ketals can be represented as follows:

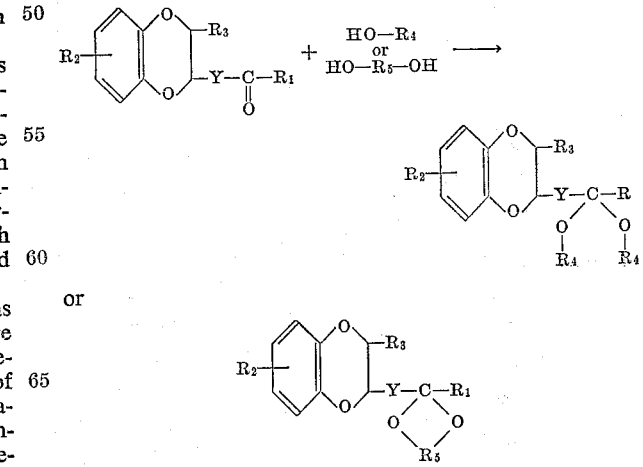

wherein $R_1$, $R_2$, $R_3$ and Y have the significance previously assigned, $R_4$ represents a lower alkyl such as methyl, ethyl and propyl, a lower alkenyl such as allyl or a phenyl-lower alkyl such as benzyl and $R_5$ is a lower alkylene such as methylene, ethylene and propylene.

Some of the monohydric and polyhydric alcohols which can be used in the reaction are methanol, ethanol, propanol, benzyl alcohol, allyl alcohol, ethylene glycol and propylene glycol.

The preparation of the acetals and ketals is effected using conventional reaction conditions of temperature, solvent and catalysts. An excellent catalyst to use is p-toluenesulfonic acid. Benzene, toluene and xylene can be used as reaction media. The reaction can be promoted by elevated temperatures such as up to the reflux temperature. After the reaction is terminated the acetal or ketal can be recovered from the reaction mixture by conventional procedures, such as fractional distillation.

Some of the acetals and ketals produced as described are 2-formyl-1,4-benzodioxane diethyl acetal, 2-acetonyl-1,4-benzodioxane diallyl ketal, 2-acetyl-3-methyl-1,4-benzodioxane dimethyl ketal and benzyl-[3-(1,4-benzodioxyl)]-methyl ketone ethylene ketal.

The acetals and ketals also have skeletal muscle relaxant activity in animals and can be administered as described supra for the aldehydes and ketones.

The following examples are presented to illustrate the invention.

EXAMPLE 1

2-Acetyl-1,4-Benzodioxane

To 145 g. (1.35 moles) of catechol in 750 cc. of 12% aqueous technical potassium hydroxide solution was added 288.9 g. (1.35 moles) of 3,4-dibromo-2-butanone. The mixture was stirred for 18 hours after which the layers were separated and the aqueous layer extracted with 3–200 cc. portions of ether. The oily layer and the ether extracts were combined and washed thoroughly with 10% sodium hydroxide solution. After washing with water and drying over anhydrous potassium carbonate, the solvent was removed under reduced pressure and the residue distilled yielding 102 g. of product, B.P. 89–90° C. (0.3 mm.).

EXAMPLE 2

Methyl-2-(1,4-Benzodioxyl)Ketoxime

A mixture of 17.8 g. (0.1 mole) of 2-acetyl-1,4-benzodioxane and 15 cc. of pyridine in 75 cc. of ethanol was treated with 7.7 g. (0.11 mole) of hydroxylamine hydrochloride. The reaction mixture was stirred until the initial exothermic reaction had subsided and was then heated at reflux for 4 hours. After cooling, the reaction mixture was poured into 300 cc. of ice water and the separated oil extracted into ether. The combined ether extracts were washed with water and dilute hydrochloric acid. After drying over sodium sulfate, the ether was removed under reduced pressure. The residual oil was distilled yielding a single major fraction 17 g., B.P. 124–126° C. (50µ).

*Analysis.*—Calcd. for $C_{10}H_{11}NO_3$: N, 7.25. Found: N, 7.22.

EXAMPLE 3

Methyl-2(1,4-Benzodioxyl)-Ketoxime Sodium Salt

To 9.65 g. (0.05 mole) of the oxime in 25 cc. of absolute ethanol was added 18.9 cc. (1 equivalent) of 2.65 N sodium ethoxide solution. The solvent was removed under reduced pressure and the residue treated with ether. Under these conditions the residue dissolved and the salt slowly crystallized on standing. The solid was collected by filtration, washed with anhydrous ether and dried under vacuo, yielding 9.0 g., M.P. 108–115° C. (d). The sodium assay indicated a monohydrate.

*Analysis.*—Calcd. for $C_{10}H_{12}NaNO_4$: Na, 9.82. Found: Na, 9.92.

EXAMPLE 4

2-(1,4-Benzodioxyl)-Butyl Ketone

To 2.7 g. (0.11 mole) of magnesium and a crystal of iodine in 25 cc. of ether was added 15.1 g. (0.11 mole) of n-butyl bromide and 75 cc. of ether. To the Grignard solution was added 16.1 g. (0.10 mole) of 2-cyano 1,4-benzodioxane dissolved in 100 cc. of ether. The mixture was refluxed for four hours and then decomposed with 200 cc. (10%) of ammonium chloride. The organic phase was separated from the aqueous layer, washed with 100 cc. (2%) of sodium hydroxide, water and dried over anhydrous sodium sulfate. The solvent was distilled off and the product collected by distillation, B.P. 105–106° C. (0.05 mm.); yield 9 g. (41%), $N_D^{25}$ 1.5184.

*Analysis.*—Calcd. for $C_{13}H_{16}O_3$: C, 70.92; H, 7.32. Found: C, 70.63; H, 7.17.

EXAMPLE 5

2-(1,4-Benzodioxyl)-Butyl Ketoxime

A mixture consisting of 7.9 g. (0.036 mole) of 2-(1,4-benzodioxyl)butyl ketone, 7.6 g. (0.110 mole) of hydroxylamine hydrochloride, 25 cc. of pyridine and 55 cc. of ethanol was refluxed for twelve hours. The solution was concentrated under vacuum, and the residue was dissolved in 100 cc. of water. The aqueous layer was extracted with (3 x 75 cc.) ether. The combined ether extracts were washed with 5% hydrochloric acid, water, dried over potassium carbonate, and the product collected by distillation, B.P. 145–147° C. (0.4 mm.), yield 5.85 g. (69.3%).

*Analysis*—Calcd. for $C_{13}H_{17}NO_3$: C, 66.36; H, 7.28; N, 5.96. Found: C, 66.49; H, 7.58; N, 5.90.

EXAMPLE 6

2-(1,4-Benzodioxyl)-Phenyl Ketone

To 2.7 g. (0.11 mole) of magnesium and a crystal of iodine in 25 cc. of ether was added 16.5 g. (0.11 mole) of bromobenzene and 75 cc. of ether. To the Grignard solution was added 16.1 g. (0.10 mole) of 2-cyano 1,4-benzodioxane dissolved in 100 cc. of tetrahydrofuran. The mixture was refluxed for three hours and then decomposed with 250 cc. (10%) of ammonium chloride. The organic phase was separated from the aqueous layer, washed with (2%) sodium hydroxide, water, dried over anhydrous sodium sulfate and concentrated to dryness under vacuum. The residue was a viscous orange oil. Wt. 13.8 g. (57.5%).

EXAMPLE 7

2-(1,4-Benzodioxyl)-Phenyl Ketoxime

A mixture consisting of 13.8 g. (0.057 mole) of crude 2-(1,4-benzodioxyl)-phenyl ketone, 11.8 g. (0.170 mole) of hydroxylamine hydrochloride, 40 cc. of pyridine and 80 cc. of ethanol was refluxed for eight hours. The solution was concentrated under vacuum and the residue was dissolved in 100 cc. of water. The aqueous layer was extracted with (3 x 75 cc.) ether. The combined ether extracts were washed with 5% hydrochloric acid, water, dried over potassium carbonate, and concentrated to dryness under vacuum. The residue (11.9 g.) was repeatedly triturated with hot n-hexane. The solid weighed 6.5 g., M.P. 60–63° C. and was identified by infra red analysis to be the desired compound.

EXAMPLE 8

2-(1,4-Benzodioxyl)-Cyclopentyl Ketone

A Grignard solution was prepared from 16.5 g. (0.11 mole) of cyclopentyl bromide, 2.7 g. (0.11 mole) of magnesium, a crystal of iodine and 100 cc. of ether. To the above Grignard solution was added 16.1 g. (0.1 mole) of 2-cyano-1,4-benzodioxane dissolved in 100 cc. of tetrahydrofuran. The mixture was refluxed for four hours, and the complex was decomposed with 250 cc. of 10% ammonium chloride. The organic phase was separated from the aqueous layer, washed with 2% sodium hydroxide, water, dried over anhydrous sodium sulfate, and concentrated to dryness under vacuum. The residue was a heavy oil, wt. 16. g. (72.5%).

EXAMPLE 9

2-(1,4-Benzodioxyl)-Cyclopentyl Ketoxime

A mixture consisting of 15.3 g. (0.22 mole) of hydroxylamine hydrochloride, 16.8 g. (0.072 mole) of crude 2-(1,4-benzodioxyl) cyclopentyl ketone, 60 cc. of pyridine and 120 cc. of ethanol was refluxed for eight hours. The solution was concentrated to dryness under vacuum. The residue was diluted with 100 cc. of water and the oxime was extracted with (3 x 100 cc.) ether. The combined ether extracts were washed with 5% hydrochloric acid, water, dried over potassium carbonate and concentrated to dryness under vacuum. The residue (11.55 g.) was extracted repeatedly with hot n-hexane, concentrated to dryness (10.8 g.) and vacuum distilled, B.P. 133–138° C. (0.8 mm.), wt. 5.05 g. Infra red analysis indicated compound to be desired structure.

EXAMPLE 10

2-Cyano-1,4-Benzodioxane

To a solution of 207 g. (1.88 moles of catechol in 1270 ml. of acetone was added 400 g. (1.88 moles) of 2,3-dibromopropionitrile. 780 g. (5.64 moles) of potassium carbonate was added in four equal portions. The addition of the nitrile was dropwise to cause gentle reflux. The mixture was stirred at reflux for 15 hours, the salts were filtered off and washed with acetone, the filtrates concentrated under reduced pressure and the residues vacuum distilled through a short head. B.P. 103–104° C./0.8 mm., yellow distillate.

The distillate was dissolved in 500 ml. of ethyl ether and washed repeatedly with 100 ml. portions of 5% sodium hydroxide until no phenolic color appeared in the wash (9 washings required). The ether phase was dried over anhydrous potassium carbonate, filtered, the ether distilled off and the residues vacuum distilled through a 2″ Vigreux column. B.P. 95–97° C. (0.8 mm.), 211.0 g. (69.5%). Distillate solidifies as orange crystals.

*Analysis.*—Calcd. $C_9H_7NO_2$: C, 67.08; H, 4.38; N, 8.68. Found: C, 66.82; H, 4.40; N, 8.63. M.P. 56–58° C.

EXAMPLE 11

2-Methyl-2-[2'-(1,4-Benzodioxyl)]-1,3-Dioxalane

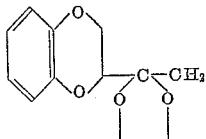

A mixture consisting of 17.8 g. (0.1 mole) of 2-acetyl-1,4-benzodioxane, 6.2 g. (0.1 mole) of ethylene glycol, 0.4 g. of p-toluene sulfonic acid and 150 cc. of dry benzene was refluxed for five hours while 2 cc. of water was collected. The organic solution was washed with (2 x 25 cc.) 2 N aqueous sodium hydroxide, water, dried over potassium carbonate and the product was collected by distillation. B.P. 90–91° C. (0.01 mm.), yield 15 g. (67.5%), $N_D^{25}$ 1.5315. M.P. 54–55° C.

Various changes and modifications of the invention can be made and, to the extent that such variations incorporate the spirit of this invention, they are intended to be included within the scope of the appended claims.

What is claimed is:

1. A compound of the formula

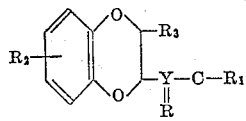

wherein Y is a member of the group consisting of a chemical bond and lower alkylene, R is a member of the group consisting of oxygen, oximino and the group NOA wherein A is a member of the group consisting of alkali metals, alkaline earth metals and the benzyl trimethyl ammonium group, $R_1$ is a member of the group consisting of hydrogen, lower alkyl, phenyl, phenyl-lower alkyl and cycloalkyl, $R_2$ is at least one nuclear substituent of the group consisting of hydrogen, nitro, amino, lower alkyl, lower alkoxy, phenoxy, hydroxy, halogen, trifluoromethyl, lower alkyl thio, phenyl-lower alkyl, lower alkenyl and lower alkynyl, and $R_3$ is a member of the group consisting of hydrogen, lower alkyl, phenyl and phenyl-lower alkyl.

2. 2-acetyl-1,4-benzodioxane.
3. Methyl-2-(1,4-benzodioxyl)ketoxime.
4. Methyl-2-(1,4-benzodioxyl)ketoxime sodium salt.
5. 2-(1,4-benzodioxyl)butyl ketone.
6. 2-(1,4-benzodioxyl)butyl ketoxime.
7. 2-(1,4-benzodioxyl)phenyl ketone.
8. 2-(1,4-benzodioxyl)phenyl ketoxime.
9. 2-(1,4-benzodioxyl)cyclopentyl ketone.
10. 2-(1,4-benzodioxyl)cyclopentyl ketoxime.
11. A compound of the formula

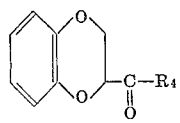

wherein $R_4$ is lower alkyl.

12. A compound of the formula

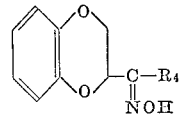

wherein $R_4$ is lower alkyl.

13. A compound of the formula

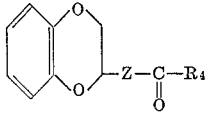

wherein Z is lower alkylene and $R_4$ is lower alkyl.

14. A compound of the formula

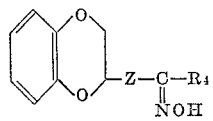

wherein Z is lower alkylene and $R_4$ is lower alkyl.

15. A compound of the formula

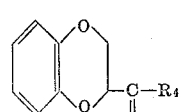

wherein $R_4$ is lower alkyl and A is an alkali metal.

16. A compound of the formula

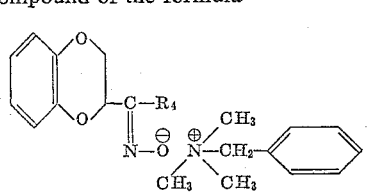

wherein $R_4$ is lower alkyl.

17. A member of the group consisting of compounds of the formula

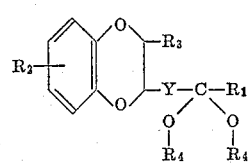

and

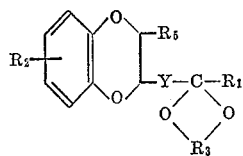

wherein Y is a member of the group consisting of a chemical bond and lower alkylene, $R_1$ is a member of the group consisting of hydrogen, lower alkyl, phenyl, phenyl-lower alkyl and cycloalkyl, $R_2$ is at least one nuclear substituent of the group consisting of hydrogen, nitro, amino, lower alkyl, lower alkoxy, phenoxy, hydroxy, halogen, trifluoromethyl, lower alkyl thio, phenyl-lower alkyl, lower alkenyl and lower alkynyl, $R_3$ is a member of the group consisting of hydrogen, lower alkyl, phenyl and phenyl-lower alkyl, $R_4$ is a member of the group consisting of lower alkyl, lower alkenyl and phenyl-lower alkyl and $R_5$ is lower alkylene.

18. 2 - lower alkyl - 2 - [2' - (1,4 - benzodioxyl)]-1,3-dioxalane.

19. 2 - methyl - 2 - [2' - (1,4 - benzodioxyl)] - 1,3-dioxalane.

References Cited in the file of this patent

Marini-Bettolo et al.: Chem. Abstracts, Vol. 54, cols. 1522–3 (1960), QD1A51, Abstracting Rend., 1st super sanita, vol. 22, pp. 201–6 (1959).

UNITED STATES PATENT OFFICE
CERTIFICATE OF CORRECTION

Patent No. 3,153,657            October 20, 1964

Claude I. Judd et al.

It is hereby certified that error appears in the above numbered patent requiring correction and that the said Letters Patent should read as corrected below.

Column 1, line 60, for "proces" read -- process --; lines 65 to 70, the lower right-hand portion of the second formula, for column 2, line 50, for "distilaltion" read -- distillation --; column 6, line 75, for "16. g." read -- 16.8 g. --; column 7, line 21, after "moles" insert a closing parenthesis; lines 44 to 49, the lower right-hand portion of the formula should appear as shown below instead of as in the patent:

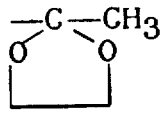

same column 7, lines 66 to 70, the lower right-hand portion of the formula should appear as shown below instead of as in the patent:

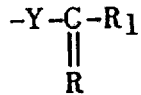

column 9, lines 1 to 7, the formula should appear as shown below instead of as in the patent:

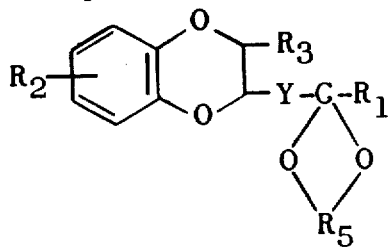

Signed and sealed this 23rd day of March 1965.

(SEAL)
Attest:
ERNEST W. SWIDER
Attesting Officer

EDWARD J. BRENNER
Commissioner of Patents